Dec. 18, 1951 E. J. HOUDRY 2,578,704
REFORMING OF HYDROCARBONS WITH
DEHYDROGENATION CATALYSTS
Filed July 8, 1947
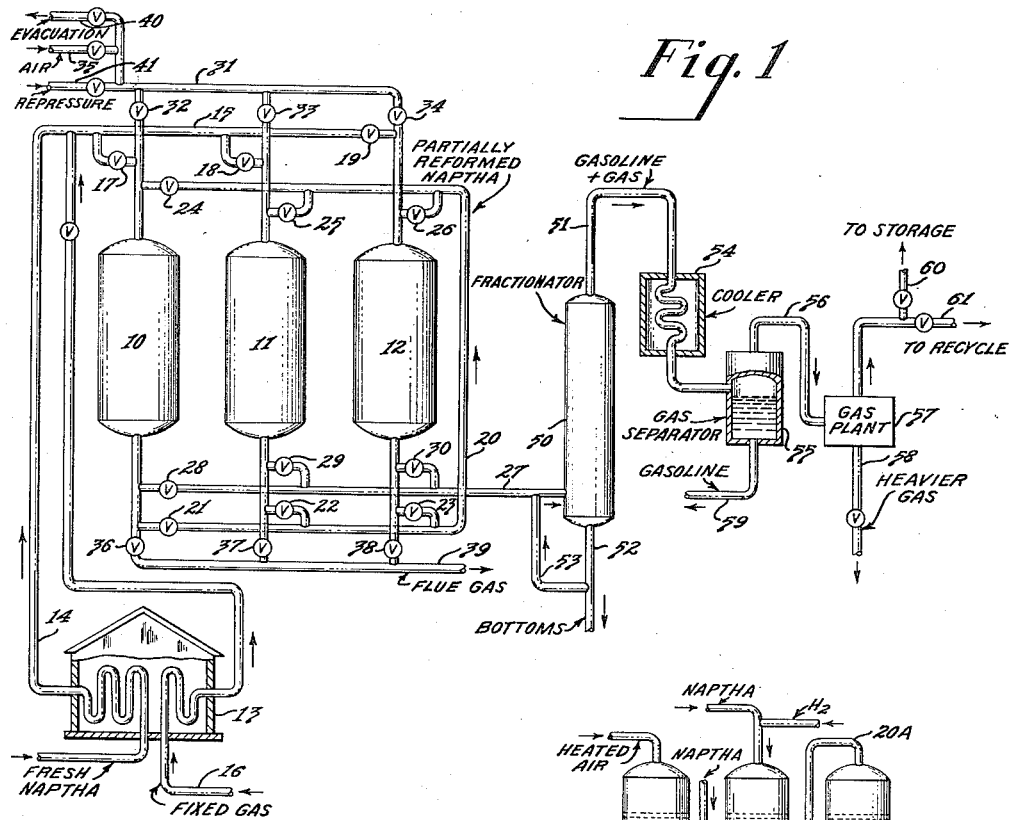
Fig. 1
Fig. 4
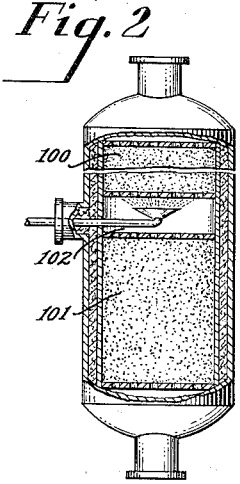
Fig. 2
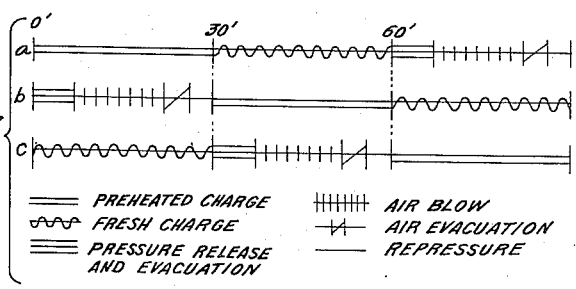
Fig. 3
— PREHEATED CHARGE ⊦⊦⊦⊦⊦⊦ AIR BLOW
∿∿∿ FRESH CHARGE ⊣⊦ AIR EVACUATION
≡ PRESSURE RELEASE — REPRESSURE
AND EVACUATION
INVENTOR.
Eugene J. Houdry
BY
Gordon A. Kessler
ATTORNEY.

UNITED STATES PATENT OFFICE 2,578,704

REFORMING OF HYDROCARBONS WITH DEHYDROGENATION CATALYSTS

Eugene J. Houdry, Ardmore, Pa., assignor to Houdry Process Corporation, Wilmington, Del., a corporation of Delaware Application July 8, 1947, Serial No. 759,497

21 Claims. (Cl. 196—49)

The present invention relates to catalytic processes for treating of hydrocarbons and is more particularly concerned with improvements in methods for the production from low grade gasoline and naphthas of products of improved quality including enhanced octane rating. More specifically the invention is directed to improvements in these processes wherein such hydrocarbon fractions are contacted with dehydrogenating catalysts in the presence of hydrogen under conditions resulting in further release and net production of hydrogen in the process.

Operations have been described in the literature and prior patents wherein hydrocarbon fractions such as those boiling in about the gasoline range are contacted with a dehydrogenating catalyst such as alumina-molybdenum oxide at elevated temperatures and in the presence of added hydrogen. These operations when conducted under appropriate processing conditions have the net effect of removing hydrogen from the hydrocarbons present, incident to various complex reactions taking place, but it is generally considered that the principal reactions involve dehydrogenation and cyclization. These reactions being essentially endothemic, necessitate the addition of heat to further the reactions and to maintain the required reaction temperature. During the endothemic reaction, the catalyst more or less gradually becomes depreciated in activity or selectivity for the required reaction and there is deposited on the catalyst a carbonaceous or hydrocarbonaceous material called "coke." After an appropriate period of operation, accordingly, the catalyst may be subjected to a regeneration treatment with an oxidizing gas to remove the deposited coke.

I have found that if the fresh hydrocarbon feed is initially contacted with catalyst of a lower activity, equivalent upgrading in the octane number of the charge stock may be realized with concomitant formation of a smaller quantity of coke. This discovery is utilized to beneficial advantage in the improved process of the present invention by conducting the hydrocarbon treating operation so that the hydrocarbon stream is subjected to increasing reaction temperatures within and over a relatively wide range and by flowing the fresh hydrocarbon feed first through a mass of catalyst on which coke has already been deposited before contacting said feed with more active catalyst. By successively increasing the intensity of the reaction conditions in this manner, gasoline of exceedingly higher octane rating was obtained for the same quantity of by-product coke produced in the reaction than when the fresh charge was contacted directly with the more active catalyst. The improved process can therefore be conducted under selected conditions to obtain a required octane gain with consequent deposition of substantially less coke. Because of the lower quantity of coke formed and consequent lesser rate of deactivation of the catalyst, it would be possible to employ the catalyst in the described hydrocarbon conversion operation for an increased length of time before subjecting the catalyst to regeneration. I have determined, however, that greater economic advantages are obtained by maintaining relatively short the periods that the catalyst remains in contact with hydrocarbons between regenerations, whereby relatively low total coke deposit is obtained with resultant maintenance of high catalyst activity level throughout the entire on-stream period, which small amount of coke deposited on the catalyst, in turn, makes possible the short on-stream period employed since that quantity of coke can be readily burned during the short degeneration period provided by the cycle. In this manner comparatively larger quantities of hydrocarbons can be processed to the required extent of upgrading in quality than is otherwise possible in a plant of equivalent catalyst capacity.

The above indicated sequence and novel technique of operation can be advantageously performed by providing a plurality of reaction zones or reactors containing catalyst of succeedingly higher activity as a result of differences in coke content; the temperature, and if desired other conditions, in each of said zones or separate reactors being capable of individual variation. In accordance with the preferred embodiment, hereinafter more fully described, the described treatment is carried out in a system employing fixed catalyst beds, the hydrocarbon being reacted in two or more stages under selected and successively more severe operating conditions in traversing the separate zones or stages. In particular, the gasoline or naphtha charge is subjected to successively increased temperature and to catalyst of successively increased activity. When two stages of reaction are employed, this is preferably accomplished by operating three separate reaction vessels in cycle, as follows: to one converter containing unregenerated catalyst which has been used previously to complete conversion of partially dehydrogenated charge there is fed a stream of fresh hydrocarbon charge at temperatures lower than that of said catalyst for an operating or on-stream period. During that period the fresh hydrocarbon stream is treated by the catalyst and while cooling the latter the hydrocarbons are increased in temperature and undergo dehydrogenation, resulting in a partially dehydrogenated charge which is then passed into and through a second converter containing the more active freshly regenerated catalyst which supplies further heat to the charge and promotes further reaction thereof to form the final aromatic rich product which is sent to suitable recovery equipment. During the aforesaid operating period the third converter is being regenerated by burning of coke deposit under conditions that increase the temperature of the catalyst to desired maximum conversion level.

At the end of that period, the stream of fresh hydrocarbon charge is transferred to the converter heretofore receiving partially dehydrogenated charge and the products therefrom pass through the converter now containing heated and freshly regenerated catalyst. The converter previously engaged in dehydrogenating fresh charge then enters the regeneration phase of the cycle. At the end of a second on-stream period during which this altered relationship of the converters is maintained, the functions of the converters then progress in the direction indicated above so that at the end of the next or third operating period each converter will have successively been engaged in (1) regeneration, (2) transformation of partly converted effluent from another converter, and (3) receiving fresh hydrocarbon charge.

Contacting the partially coked catalyst with fresh hydrocarbon charge at lower temperature than the catalyst provides an additional important advantage in the process in thereby simultaneously effecting further cooling of the catalyst, so that it can consequently be subjected to regeneration during the time provided by the designed operating cycle with undiluted air without imparting to the catalyst as a result of regeneration, temperatures in excess of that desired for the on-stream reactions and without necessitating direct or indirect cooling of the catalyst during regeneration, as with cool gases or extraneous heat exchange medium.

The reaction temperature maintained during the first stage of the treatment on the fresh charge may be in the range of 750 to 950° F. and the efflux is brought into contact with the freshly regenerated catalyst for further reaction at higher temperature in the range of about 900 to 1000° F. The inlet temperature of the charge and the temperatures in the two stages of treatment are selected so that the reactions take place over a wide range of temperatures, as of not less than about 100° F. gradient and preferably in the order of about 200° F. or somewhat higher.

Except for incidental pressure drop, the pressure may be the same in each stage of the treatment, the total pressure for each stage preferably being from about 150 to about 300 pounds per square inch. In order to maintain more effective control of the kind and quality of the products formed in the process hydrogen is added to the charge in the first stage, generally in the form of hydrogen-rich recycled dry gas formed in the process, which gas passes to the second stage together with the reaction products from the first stage. For this purpose, there is usually employed an amount of hydrogen or of hydrogen-rich gas sufficient to furnish about 0.5 to 2 or more mols of hydrogen per mol of fresh hydrocarbon charged. In the preferred operation no intermediate treatment or handling of the total efflux passing from the first stage to the second stage is required.

As has been already pointed out, by contacting the fresh charge initially with catalyst of lower activity, less total coke is deposited from the charge for the same increase in octane, or for the same quantity of coke deposited the gasoline produced in the process is of much higher octane rating. For example an East Texas naphtha of 40 octane number (C.F.R.–M.) was transformed into gasoline of 78 octane number in the described two-pass operation with deposition of coke amounting to 1.17% by weight of the charge. The same fresh charging stock contacted directly with clean catalyst produced gasoline of only 66.5 octane number at substantially the same coke level (1.12% coke). It will be understood that further upgrading of the gasoline produced in the latter run to the level of that obtained in the run first described is not a linear function of the coke deposited, but at the higher octane levels increasingly more severe conditions are required to effect the same unit of octane gain with consequent production of increasingly greater quantities of coke. This smaller quantity of coke deposited for a desired octane increase when operating in accordance with the present invention has important advantages not only in high yields of desired product, but in enabling simplified and more economic control of the operation. Preferably, the operating cycle is selected to be sufficiently short that the total coky deposit on the catalyst when presented to regeneration is relatively low as hereinafter described.

Accordingly to preferred aspects of the invention, the process is effected under conditions of substantial balance as between its endothermic and exothermic phases. In fact, it is one of the important characteristics of the invention that substantially all of the heat produced by burning of the coky deposit is utilized, after storage in the contact mass, to provide the heat necessary for the on-stream process, including the net endothermic heat of the dehydrogenating and other reactions and sensible heat for increasing the temperature of the hydrocarbon stream from feed temperature to the desired maximum conversion temperature, say from about 750° F. to 1000° F. range in general, but lower feed temperatures and higher maximum temperatures have been employed as will hereinafter appear. The use of the relatively wide range of conversion temperatures and of the described plurality of contact stages makes possible achievement of such a balance because of the low yields of coke with respect to the extent of hydrocarbon conversion effected while the catalyst is at highest levels of activity. Under these conditions the quantity of coke is sufficiently small that upon burning, the heat it produces is not inordinately in excess of that required for the on-stream processes. Use of the catalyst at the stated high activity levels, it has been discovered, permits high throughputs per unit volume of catalyst without sacrificing in octane increase.

In order that the catalyst always remains within the desired range of on-stream reaction temperatures, for example within about 100° F. to 250° F. range of temperature differential, the total quantity of hydrocarbon charge fed thereto between regenerations is limited, considering its susceptibility to dehydrogenation, so that the total coky deposit produced thereby yields upon burning substantially the quantity of heat necessary for changing the temperature of the contact mass from desired minimum to desired maximum. For most straight run and other low octane naphthas and with typical commercial catalysts, for example, active alumina and molybdenum oxide, this result is achieved and the catalyst is maintained at a high level of activity when the total coke deposit produced by the reaction and removed during regeneration aggregates 2% or less by weight of the catalyst. Certain of the important advantages of the invention, including maintenance of the catalyst at sufficiently high level of activity to permit maximum octane improvement at high throughputs (ratio of volume of feed per volume of catalyst), are not realized if this quantity of coke is exceeded. Preferably, the cycle of operations is so designed that the on-stream or reaction period provides an accumulated coke deposit of 1½ weight percent of the catalyst or less as of the order of ½ to 1%.

The quantity of feed required to achieve this condition depends upon the desired extent of octane increase and the nature of the naphtha or gasoline charged. As an illustration, to produce an approximately 80 octane gasoline fraction (CFR–M) from approximately 40 octane Mid-Continent heavy naphtha (typical boiling range of 250–400° F.) the coky deposit obtained in preferred practice of the invention will aggregate in the order of 1% to 1.5% by weight of catalyst when the total feed to a two stage process during the two operating periods of a single reactor is in the order of 1.6 to 2.4 volumes per volume of catalyst in such reactor. To achieve octane increase of the order of 60 octane numbers to reach about 80 octane (CFR–M) substantially deeper or more extensive conversion of the charge is required, producing coke yield substantially greater than that obtained in achieving the 40 octane increase and accordingly, the quantity of 20 octane charge to produce coke deposit of about 1% by weight of the catalyst is substantially decreased.

Operating under these conditions with a comparatively short cycle time, the total throughput of hydrocarbons can be maintained at a high rate. Thus, in accordance with the present invention, high yields of gasoline of improved quality can be obtained from low grade naphthas, when operating up to liquid space rates of 2 volumes of fresh hydrocarbon charge per volume of catalyst (in the primary reactor) per hour or somewhat higher, while the ratio of catalyst to oil during each cycle may be maintained at 0.5/1 or above and preferably above 1 as for example up to 4. As will be understood, instead of operating the present process to obtain increased throughput for a desired octane improvement, the process may be operated without increasing the rate thereby obtaining further enhanced octane improvement. The on-stream operating periods may be from about 15 minutes to about one hour, about one-half hour being preferred.

With catalytically active bodies of sufficiently high heat capacity (specific heat×density) the catalyst temperature will remain within the desired hydrogenation temperature range when operating under the described conditions, but with commercially available molybdenum oxide on alumina catalysts, to obtain the desired thermal balance in the operation it is necessary to supplement the heat capacity of the active catalyst by intimately admixing or associating therewith inactive materials of compartively high heat capacity. For this purpose one may employ the insert heat absorbing solids set forth in my U. S. Patent #2,414,812, January 28, 1947, including for instance, artificially fused alumina (3.95 density and 0.31 specific heat) or the refractory by-product known as "Corhart," comprising about 70% alumina and the remainder being chiefly silica (3.25 density and 0.27 specific heat). When individual granules of the inert high heat capacity material are employed these are to be fairly uniformly distributed in admixture with the grains or pellets of catalyst in the reactors. Also the individual granules of inert material may be of substantially the same size or of a different size than the catalyst pieces and will be employed in the required proportions such that the total contact mass (catalyst plus inert) has the capacity to acquire during regeneration the maximum conversion temperature to be employed in the subsequent on-stream reactions and will store during regeneration the heat required for heating up the charge and maintaining the endothermic reactions, as described. The volumetric ratio of active catalyst to the inert heat absorbing material, employing the types of material described, will generally lie in the range of 1:3 to 3:2.

The details of operation of the improved process will be more fully understood from the description which follows read in connection with the accompanying drawing illustrating suitable apparatus for use in practicing a preferred embodiment of the invention. In the drawings, Figure 1 is a semi-diagrammatic representation of a three case fixed catalyst bed system showing lines of flow and suitable piping and valve arrangement; Figure 2 is a front elevation, partially in cross section, of a modified form of reactor showing the arrangement of the contact mass therein; Figure 3 is a schematic time diagram of the cycle of operations of the three cases; Figure 4 is a simplified flow diagram illustrating the flow of materials during a selected stage in the cycle, using a battery of reactors arranged as in Fig. 1.

Referring now particularly to Fig. 1, there are shown three reactor cases, 10, 11, 12; the cases being generally similar in structure and capacity. Each of the cases in operation will contain the same kind of contact mass, but the contact mass in each case will be in a different condition as determined by the particular position of the case in the designed sequence of operations, as will appear below. A fresh hydrocarbon charge stock, which in accordance with the invention may be a low grade gasoline or naphtha fraction, is vaporized and heated to somewhat below the desired reaction temperature by being passed through a suitable heating means such as a furnace 13 and the heated vapors conducted in line 14 to a distributor supply line 15 communicating with each of the three cases, as shown. A hydrogen-rich gaseous stream is also heated to substantially the same temperature as the hydrocarbon charge by being conducted through the furnace 13 by means of a line 16 which is connected at its terminus with supply line 15, whereby the heated gases are introduced into the supply line 15 for selective distribution with the vaporized hydrocarbon charge to each one of the cases 10, 11, 12. The quantity of gas added through the line 16 may be controlled and adjusted by suitable metering or proportioning devices (not shown) arranged in advance of admission of the gas for heating in the furnace 13. Admission of the mixture of vaporized charge and added gas to each of the respective cases 10, 11, 12 is controlled by suitable valves 17, 18, and 19; it being understood that only one of said valves will be open and the other two closed during any given period in the cycle of operations. A connecting line 20 is provided communicating with all three cases at top and bottom through valves 21, 22, 23, 24, 25, 26 which can be selectively operated to permit the total efflux from one case to be brought to another case in the series; as shown the efflux discharged from the bottom of any one case may be conducted to the top of any other desired case. Discharge line 27, communicating with the bottoms of the cases respectively through valves 28, 29, 30, is provided for discharging the final reaction products including reformed gasoline and unreacted and formed gases from the reaction, the discharge line 27 communicating with suitable means for separation of the products. A manifold 31 also communicates with the three cases under selective control of valves 32, 33, and 34. Regenerating gas may be supplied as required to any one of the cases by means of a valve controlled supply line 35 communicating with the manifold 31, which gas is supplied to the desired case by opening of one of the appropriate valves 32, 33, 34. Regeneration fumes (flue gas) can be discharged from each of the cases under control of valves 36, 37, and 38 to a common flue gas waste line 39. Means are also provided for selective evacuation of the individual cases by a vacuum line 40 communicating with manifold 31 and pressuring gas may be supplied as required through line 41 also communicating with the said manifold.

The operation of the system thus far described is as follows: Selecting for illustration the position of the operating sequence just after valve changes have been made such that case 10 is taken off-stream, to be evacuated and regenerated and case 12 contains contact mass which has just been regenerated and is being put on-stream for the second stage treatment of the hydrocarbon charge, case 11 will then contain partially coked contact mass from a previous use in a second stage treatment and will now be ready for use in contacting the fresh hydrocarbon charge for its first stage of treatment. The fresh naphtha charge in preheated and vaporized state together with the heated hydrogen-rich gas are brought through supply line 15 and open valve 18 to contact the partially coked catalyst in case 11 and the thus heated and treated product discharged through valve 22, line 20, and valve 26 into the top of case 12 where it is brought into contact with the freshly regenerated contact mass therein. The final products resulting from the treatment of the hydrocarbon charge in cases 11 and 12 now are discharged from the latter case through valve 30 and line 27 by means of which the discharged products are conducted to suitable separating or fractionating equipment. The other valves communicating with lines 15, 20, and 27 remain closed during the described operation.

As shown by the time diagram in Fig. 3, while cases 11 and 12 are thus being employed in the catalytic treatment of naphtha during a thirty minute period, case 10 goes through regeneration and a series of steps connected therewith. Thus, valves 33, 34, 36, 37, and 38 being closed, valve 32 is opened to exhaust case 10 by evacuation through opened line 40, thereby removing any contained gases or vapors remaining from the preceding operation. After a suitable period of evacuation, an oxygen-containing gas such as air, is admitted to case 10 through opened line 35 and valve 32. The oxidizing gas burns off the coke present on the contact mass and heats up the catalyst and the admixed inert material, thereby storing sufficient heat in the mass for use in the subsequent naphtha heating and treating steps as already mentioned. The gases formed as a result of regeneration are withdrawn through discharge line 39, valve 36 being open during the burning step. When the oxidation has been carried out to the required extent the supply of oxidizing gas is cut off, and the residual gas in the case 10 is exhausted by evacuation through line 40, valve 36 being again closed. Following evacuation, case 10 will be brought back to desired pressure by discontinuing the exhaust and admitting repressuring gas from line 41 into the case through valve 32, valve 36 remaining closed.

Preferably, use is made of hydrogen or hydrogen-rich gas in the repressuring operation, which gas may be derived in whole or part from the fixed gas produced in the naphtha treating operation. In so doing, the catalyst comprising molybdenum oxides, which may have been brought to a higher state of oxidation as a result of regeneration, will again be reduced by contact with the hydrogen-containing or other reducing gas. Instead of bringing the regenerated case back to full operating pressure by means of the reducing gas, the pressure may be built up only in part by admission of reducing gas, the balance of the needed pressure being furnished by suitable control of the admission of the vaporized hydrocarbon charge.

As will be understood from examination of Fig. 3, the cycle of operations is repeated every ninety minutes. Each of the three cases in that period being used, by suitable actuation of the valves in time sequence, for thirty minutes' operation on partially processed charge from a preceding stage of treatment, for the next thirty minutes for the treatment of fresh charge, the case being thereafter subjected to regeneration of the contaminated catalyst therein, including the steps of evacuation and repressuring for the remaining period.

The position of the cases at the beginning of that part of the cycle already described above would correspond to that illustrated at the 60' mark designated in Figure 3: that is: case 10 (graph a) is to be prepared for regeneration; case 11 (graph b) is to receive fresh hydrocarbon charge; and case 12 (graph c) is to receive the preheated and treated charge from case 11. At the end of the 30 minute period taken up by these operations, the entire cycle will be completed and will be repeated as designated, beginning at zero time in the graphs. Thus at the beginning of the new cycle after appropriate valve changes (zero time on the graph) and for the first 30 minutes of the new cycle case 10 will now receive the preheated charge from case 12 which latter now will receive fresh charge, during which time case 11 will be prepared for regeneration and will be regenerated. At the end of the first 30 minutes of the new cycle, after further appropriate valve changes, and during that portion of the cycle represented between 30' and 60' time marks on the graphs, case 10 will be receiving fresh charge, case 11 will be receiving preheated charge from case 10, and case 12 will be subjected to regeneration; and so on for the repeating cycles.

During the thirty minute period in which the catalyst in any case is being restored to activity and the case made ready for return on stream, only about fifteen minutes are required for the flow of oxidizing gas to accomplish the regeneration proper, the balance of the period being taken up by the pressure release, evacuation, and repressuring steps in the indicated sequence. As shown in the time diagram (Figure 3) about one half of the remaining fifteen minutes may be employed in the pressure release and evacuation prior to regeneration, while the balance of the time remaining after regeneration proper may be devoted to evacuation of the residual gases and repressuring of the case; the time for the later two steps being divided equally or as required. For instance, sufficient time may be allowed for the evacuation of the flue gases and any remaining time then used up in permitting the pressure in the case to build up as high as the remaining time will permit, but not in excess of the required operating pressure for the subsequent on-stream reaction. As stated, if the regenerated case is then below the required operating pressure, the initial flow of charge during the subsequent on-stream period is employed in reaching the required operating pressure.

The operation of the appropriate valves in proper timed sequence can be effected by the provision of motor-actuated valves controlled by a cycle timer, suitable types of valve actuating and cycle timing devices being well known and commonly in use in petroleum processing and refining units, such as that described in the U. S. Patent to H. J. Appel No. 2,250,453 of July 29, 1941.

In Fig. 2 is illustrated a modified form of reactor case to be employed in a fixed bed catalyst system, which type of case is designed for improved control of temperature during the reaction. The contact mass, which is composed of predetermined proportions of catalyst and inert high heat capacity material such as "Corhart," is arranged in two or more spaced beds as shown at 100 and 101, provision being made for the introduction of hydrocarbon charge between the beds, as in the space provided at 102. In this preferred form of operation the temperature in the case during the on-stream period is prevented from rising above that desired and maintained under control by introduction of a portion of the hydrocarbon charge stock to be treated, at 102, at a temperature lower than that acquired by the partially treated and heated vapors passing from bed 100; the products being thus cooled by admixture with the charge at lower temperature are then passed together into and through the contact mass in bed 101.

A simplified flow diagram illustrating the use of the type of case shown in Fig. 2, is represented in Fig. 4; cases 10A, 11A, and 12A corresponding in position to that already described in connection with cases 10, 11, and 12 of Fig. 1. In the illustrated position in the cycle of operations case 12A will contain freshly regenerated catalyst, case 10A will contain contaminated catalyst being subjected to regeneration and case 11A will contain partially coked catalyst from the previous hydrocarbon treating step. The fresh hydrocarbon charge stock which in accordance with the invention may be a low grade gasoline or naphtha fraction, such as one having an end point above the range of gasoline as up to 450° F., having been vaporized and heated to somewhat below the desired reaction temperature, is initially brought into contact with the partially coked catalyst, which in the given instance is contained in case 11A. Hydrogen in the form of a hydrogen-rich gas is added to the vaporized charge entering the case 11A and the resulting products discharged from this case are then passed by line 20A into case 12A which contains freshly regenerated catalyst. The formed reaction products containing upgraded gasoline, hydrogen, and other products formed in the process, are discharged from the case 12A and conducted to suitable means for separating the products into the desired fractions.

The contact mass contained in each of the cases is preferably made up of a dehydrogenation catalyst such as alumina-molybdenum oxide and an inert heat retaining material such as the refractory silica-containing fused alumina mass described, for instance in the ratio of about one part per volume of catalyst to about 1.2 to 1.4 parts by volume of the inert material. Preferably the composition of each bed in a multibed case will be substantially the same, although some variation is permissible if desired for balancing the heat and temperature distribution. In the embodiment illustrated in Figs. 2 and 4 comprising two spaced catalyst beds, the upper bed may contain about 25% and the lower bed about 75% of the total contact mass in each of the cases. It will be understood, however, that the position of the space 102 between the catalyst beds in the reactors may be varied as required to provide beds of equal size or the upper or lower bed may have a larger capacity and content of contact mass. Additional spacings between beds for introduction of hydrocarbons to control temperature of reaction may be provided if desired. The operation is so designed that the freshly regenerated contact mass, as described provides sufficient heat for the ensuing two stages of the endothermic reaction; the said contact mass being in general within the temperature range of about 900 to 1000° F. at the end of the burning period. The regenerated catalyst will have been reduced after regeneration by contact with a hydrogen-rich gas and the case containing the same will have been repressured, advantageously with that same gas, to about 50 to 200 lbs. per square inch gauge. The regenerated case will then be brought to the required operating pressure, balancing that of the case in series therewith, of say 300 pounds per square inch gauge, by initially permitting the pressure to build up preferably by admission of the products from that case or of vaporized hydrocarbon materials from another source if desired. In the given illustration, the contact mass in case 11A will be at a lower temperature than that in case 12A, as in the range of about 750 to 950° F. average temperature, as a result of the mass therein having been cooled by previous use in an operation presently being performed in case 12A, by virtue of which also the contact mass in case 11A will contain a quantity of deposited coke. This quantity of coke together with the additional quantity of coke which will be deposited in the contact mass in case 11A from the fresh hydrocarbon charge brought into contact therewith during the ensuing thirty minute operation, is such as will store on regeneration the required quantity of heat as hereinbefore described. The catalyst in case 11A as well as that in case 12A, should, in accordance with the invention, be at a higher temperature than the introduced charge, so that the heat stored in the contact mass is supplied for further heating up the hydrocarbon charge within and through the operating range as it passes successively through the two on-stream reactors and provides the heat needed for the dehydrogenation, cyclization and other concomitant reactions taking place. To illustrate, the coked contact mass of case 11A may be at an average temperature of about 930 to about 980° F., while that of the freshly regenerated mass in case 12A may be at about 950-1025° F. average temperature but will be above that in case 11A; the charge of preheated naphtha vapors and admixed gas introduced at the top of reactor 11A may be preheated to about 650 to about 850° F. while the naphtha vapors entering case 11A between the beds of contact mass, through line 15B will be at the same or usually at a lower temperature; for instance, if the vapor feed to the top of the reactor is introduced at 800° F., the vapor feed introduced between the beds may be at about 750° F. This difference in temperature of the portions of the charge introduced into the different levels of the reactor, may be obtained in any desired manner, as by the use of separately controlled heating means or by passing the desired part of the charge required to be of lower temperature through a shorter path in the same heater. As the vaporized naphtha charge continues its passage through reactors 11A and 12A it is accordingly further heated and subjected to increasing reaction temperatures, the final products discharging from the reactor 12A being at approximately the temperature of the contact mass near discharge end of the reactor 12A. Except for the introduction of vapor feed between the beds, the above indicated ranges of temperature apply likewise in using the embodiment illustrated in Figure 1.

It will be understood of course that modifications in design and capacity of the reactors and the auxiliary equipment employed in the system, as well as the individual characteristics of the charge and of the contact mass, will to a large extent govern the actual temperatures employed in preheating the charge as well as the selected temperatures for the contact mass in the cases. Accordingly, the ultimate conditions and temperatures will be selected within the described range to maintain the desired thermal balance with minimum necessity for adjustment of conditions during the operation. Once the conditions have been determined for any particular system and a given charge stock, the cycle of operations under appropriately balanced conditions may be left to automatic control with very little necessity for manipulation by the operator.

Now coming back to Fig. 1 and describing particularly the recovery of the upgraded gasoline from the products formed in the operation, line 27 conducts the discharged products from the two stage catalytic treatment to a suitable system for separation of the desired fractions, which may comprise a fractionator 50 designed to separate the products into two or more fractions of different boiling range, but at least providing for the separation of an over-head stream comprising the improved gasoline and gases and a bottoms fraction containing materials boiling above the desired end point of the gasoline. As shown, the over-head fraction may be discharged from the fractionator 50 by means of a line 51 and the bottoms fraction discharged therefrom by means of a line 52. Provision may be made, as is usual in such systems, for recycling a portion of the bottoms fraction as through the branch line 53 back into the line 27 communicating with the fractionator. The gasoline and gas in line 51 is passed through a cooler 54 to effect condensation of the desired gasoline portion which is separated from accompanying gases in a gas separator 55. The separated gas fraction is conducted overhead by a line 56 to suitable gas treating equipment, diagrammatically indicated at 57, for separating the gas fraction into lighter and heavier portions. For instance, there may be separated out a lighter fraction containing principally hydrogen and C-1 gases and if desired a portion of the C-2 gases; the heavier gases discharged in line 58 containing C-3, C-4, and perhaps a portion of the C-5 hydrocarbons are collected for any desired use, and may be employed for instance in adjusting the vapor pressure of condensed gasoline. Any liquid condensed from the separated heavier gas from line 58 may be added to the recovered gasoline.

The lighter gases may be conducted to storage by means of the valved by-pass 60, and a required portion thereof recycled through line 61, which may be connected by suitable means with the line 16 entering the furnace 13 as well as with the line 41 for the supply of repressuring gas to the cases. Means may also be provided for purification of the recycled gas stream in line 61 to maintain the desired hydrogen concentration or remove undesired impurities, for instance by means of selective absorption, chemical treatment or suitable gas fractionating equipment. Since hydrogen and other light gases are being continuously formed from the treated naphtha charge it will be necessary to remove a portion of the formed gases from the system, which may be accomplished through the valved branch line 60.

Although other types of catalysts are known to be generally effective in dehydrogenation and dehydroaromatization of gasoline and naphtha fractions, it is preferred to employ catalysts comprising a major portion of alumina and a minor portion of molybdenum oxide. Suitable catalysts of this type are those comprising about 3 to 20% of the molybdenum oxide. The catalyst may be advantageously prepared by impregnating commercial "activated alumina" of required granule or pellet size with ammonium molybdate and heating the impregnated mass to decompose the molybdate to molybdenum oxides, which are reduced in starting up the operation to lower state of oxidation by treating with a reducing gas such as hydrogen at elevated temperature.

EXAMPLE I (A) A Michigan naphtha having the boiling range and characteristics given in the tabulation below was charged to the coked catalyst from a preceding run at the rate of 1 volume of oil (liquid @ 60° F.) per volume of catalyst per hour; the partially converted and heated naphtha being contacted with freshly regenerated catalyst. The catalyst was a composite of 90.5% by weight commercial "activated alumina" and 9.5% molybdenum oxides (calculated as $MoO_3$) in 4 mm. cylindrical pellets admixed with "Corhart" of about 3-6 mesh in the ratio of 1.2 volumes of the inert heat absorbing mass per volume of catalyst. There was added to the fresh naphtha charge a dry gas in an amount furnishing about 1.5 mols of hydrogen per mol of naphtha charged. The on-stream cycle was thirty minutes for each stage of the conversion process and the pressure was 300 p. s. i. gauge.

The coke formed in the catalyst from the reaction (30 minutes' contact with the partially converted naphtha and 30 minutes with the fresh naphtha) was burned off with air at atmospheric pressure during a fifteen minute burning period. As a result of regeneration the average temperature of the contact mass throughout the bed was about 1015° F.; the temperature of the mass during the thirty minute contact with partially converted and heated naphtha vapors (vapors at 945° F. average temperature) from the first stage dropped to an average of about 970° F., and provided the coked catalyst for treatment of the fresh naphtha charge for the next 30 minute period.

The fresh naphtha charge together with the added recycle gas was brought in at about 670° F. to contact the previously coked catalyst which thereby was reduced in temperature by the end of the period to about 895° F. average. The quantity of coke thus formed and subjected to regeneration amounted to about 8 grams per liter of catalyst. It will be seen that during the process the naphtha vapors were contacted with the catalyst for reaction over a wide temperature range from the original 670° F. charging temperature to about the maximum temperature of the catalyst, 970 to 1015° F.

The final products from the second reaction stage were treated in a fractionating column to separate the small amount of gas oil present therein from the light products and the latter then condensed and the upgraded gasoline separated in a gas-liquid separator.

The characteristics of the fresh naphtha charge and the resulting products are shown in the following table (column A).

(B) In another operation on a narrower fraction from the same Michigan naphtha of lower octane number the same contact mass and substantially the same operating conditions were employed except as herein indicated. The liquid space rate of the fresh naphtha feed to the coked catalyst was increased to 1.5. The temperatures observed during the operation for the charge and the contact mass were as follows: fresh naphtha feed inlet temperature 650° F.; average temperature of the contact mass after regeneration was 980° F. which dropped during the 30 minute period of contact with the heated and treated naphtha vapors to 945° F., another 90-100° F. drop in the temperature of the contact was occurring during its 30 minutes' contact with the fresh naphtha vapors. The characteristics of the charge and of the condensed gasoline fraction are given in the table below (column B).

(C) In this run a lower boiling fraction of the same naphtha was treated under substantially the same conditions as before except that the liquid space rate was again 1.0 and the quantity of added gas was reduced to 1.0 mole of H₂ per mol of naphtha charged. The temperatures observed were as follows: fresh naphtha feed inlet 775° F.; average temperature of the contact mass after regeneration was 965° F. dropping to 950° F. during contact with the treated naphtha vapors and to 900° F. at the end of the period of contact with the fresh naphtha charge. The characteristics of the charge and of the products are given in the table below (column C).

In this example and those which follow reference is made to the inlet temperature of the naphtha vapors and to average temperatures of the beds of contact mass obtaining during the on-stream periods in each of the two stages. In traversing each bed of contact mass the naphtha vapors attained temperatures at least as high as the indicated averages. It is therefore apparent that the range of temperature of the naphtha during its contact with catalyst is at least the difference between the naphtha inlet temperature and the lower of the average temperatures of the contact mass through which the naphtha passes in the second stage.

It is obvious that in early stages of the on-stream periods the increase in temperature of the naphtha vapors is even greater.

In certain instances the inlet naphtha temperatures may have been somewhat below that at which desired reaction proceeds at sufficiently rapid rate. Whether substantial reaction is effected at or somewhat above such inlet temperature, the naphtha is brought rapidly into desired reaction temperature range. Any preheating of the naphtha to such desired range is within the scope of the invention, since the heat thereby released by the catalyst is utilized directly to supply the required heat for thermal balance in the process. Variation of the inlet temperature of the naphtha vapors thereby also provides a convenient manner for maintaining the required thermal balance.

*Table 1*

| Stock Charged | Michigan Naphtha | | |
| --- | --- | --- | --- |
| Run | A | B | C |
| Boiling Range, ° F. (Initial to end) degrees | 128-424 | 226-426 | [1] 107-275 |
| A. P. I. ° | 59.1 | 55.2 | 76.9 |
| C. F. R. Motor | 19.6 | 4.2 | 59.7 |
| Yields—Free of H₂ Chg'd as Per Cent Wt. of Charge Stock: | | | |
| Dry Gas | 17.4 | 11.2 | 13.1 |
| Gasoline—Cont'g all C₄ | 77.1 | 83.7 | 86.1 |
| Gas Oil | 3.5 | 3.6 | Nil |
| Coke | 2.0 | 1.5 | 0.8 |
| Dry Gas—Calc. Comp.: | | | |
| Mol Per Cent—Hydrogen | 36.3 | 57.6 | 40.7 |
| Methane | 28.1 | 17.3 | 24.4 |
| Ethane | 20.7 | 14.6 | 17.5 |
| Propane | 14.9 | 10.5 | 17.4 |
| Spec. Gravity | 0.62 | 0.45 | 0.61 |
| Condensed Gasoline—Comp. and Properties: | | | |
| Wt. Per Cent—Isobutane | 2.3 | Nil | 2.8 |
| N.-Butane | 6.5 | 5.3 | 5.8 |
| C₅ & Heavier | 91.2 | 94.7 | 91.4 |
| A. P. I. ° | 57.3 | 54.3 | 73.6 |
| R. V. P., 100° F. | 12.8 | 8.9 | 14.9 |
| CFR—M.—Clear | 75.6 | 70.0 | 79.0 |
| CFR—R.—Clear (gasoline+gas oil) | 84.6 | 76.0 | 83.6 |
| Inspection of products (C₅—410° F. fraction): | | | |
| A. P. I. ° | 51.0 | 50.7 | |
| I. B. P. ° F | 124 | 134 | |
| E. P. ° F | 404 | 397 | |
| Color | 30+ | 30 | |
| Sulfur | 0.03 | 0.02 | |
| Brom. No. | 6.8 | 5.9 | |
| ASTM gum | 0.5 | 0.2 | |
| Copper gum | 1.0 | 1.0 | |
| O₂ induction hrs | 10+ | 10+ | |
| Doctor | Sweet | Sweet | |
| Cu Strip | O. K. | O. K. | |
| Total coke burned, gms./lit. catalyst | 8.0 | 7.5 | 2.5 |

[1] 95% at 203°.

Example II

The heavy naphtha identified in the table below was charged to the same contact mass and under substantially the same conditions as described in the preceding example except that the liquid space rate was increased to 2 volumes of naphtha per volume of catalyst per hour; the gas added to the charge corresponded to 1.5 mols of hydrogen per mol of naphtha. The naphtha and added gas were brought in at approximately 700° F. to contact the previously coked catalyst which was at about 935°–940° F. average bed temperature and the treated and heated naphtha vapors from this pass were contacted with freshly regenerated catalyst which was initially at 960° F. average through the bed. The coked catalyst subjected to regeneration was at about 845° F. average and was brought to the stated average maximum temperature (960° F.) during the 15 minute burning period.

The characteristics of the charge and the products obtained are shown in the table below:

*Table 2*

|  | Charge, East Texas heavy naphtha | Products, Condensed Init. to 410° F. |
|---|---|---|
| A. P. I. ° | 49.2 | 47.6 |
| I. B. P., ° F | 264 | 106 |
| 5 | 290 | 156 |
| 10 | 296 | 192 |
| 20 | 304 | 244 |
| 30 | 310 | 271 |
| 40 | 316 | 287 |
| 50 | 322 | 296 |
| 60 | 330 | 308 |
| 70 | 338 | 322 |
| 80 | 348 | 336 |
| 90 | 363 | 356 |
| 95 | 376 | 379 |
| E. P | 402 | 411 |
| Residue | 0.8 | 0.5 |
| Recovery | 99.0 | 97.0 |
| R. V. P | | 8.4 |
| Color | | 30 |
| Sulfur | | 0.02 |
| Br. No | | 5.0 |
| ASTM Gum | | 0.5 |
| Copper Gum | | Nil |
| $O_2$ Induction | | 10 hrs.+ |
| Doctor | | sweet |
| Cu. Strip | | O. K. |
| C. F. R.—M. clear | 40.5 | 78.4 |
| C. F. R.—R. clear | | 85.4 |

The 410° F. end point gasoline obtained was 85.3% by weight of the charge, and there was also produced 10.7% by weight of dry gas and 1.3% coke. The bottoms fraction constituted 2.7% by weight of the charge and boiled in the range of 430 to 744° F. (9.6° A. P. I. gravity).

EXAMPLE III

In the following runs the fraction charged in each instance was a Texas Pipe Line naphtha having a boiling range of 148–382° F. (5% @ 186° F., 95% @ 334° F.), 57.4° A. P. I. gravity, and showing clear octanes of 48.0 (C. F. R.-M.) and 52.7 (C. F. R.-R.). The same contact mass (catalyst and inert heat absorbing material) was employed as in the preceding examples, but the liquid space rates and hydrogen to oil ratios were varied as indicated below, with the results shown in the table.

*Table 3*

|  | A | B | C |
|---|---|---|---|
| Inlet temp. fresh vapor charge, ° F | 700 | 700 | 650 |
| Avg. catalyst bed temperatures, ° F.: | | | |
| After regeneration | 960 | 980 | 985 |
| After use on partially converted naphtha | 935 | 950 | 950 |
| After use on fresh naphtha | 835 | 860 | 865 |
| Total coke burned, gms./lit. catalyst | 8.5 | 7.2 | 7.0 |
| Liquid Space Rate (based on catalyst in one reactor), Vol. Chg./Vol. Cat./hr | 2.0 | 1.5 | 1.0 |
| Mols. $H_2$ per mol. naphtha chgd | 0.75 | 1.0 | 1.0 |

|  | A | B | C |
|---|---|---|---|
| Yields (Free of $H_2$ chg'd as per cent wt. of chg. stock): | | | |
| Dry Gas | 8.7 | 12.6 | 14.3 |
| Gasoline (Cont'g all $C_4$) | 88.5 | 84.5 | 82.1 |
| Gas Oil | 1.6 | 1.5 | 1.7 |
| Coke | 1.2 | 1.4 | 1.9 |
| Dry Gas—Calc. Comp.: | | | |
| Mol per cent Hydrogen | 58.3 | 63.4 | 62.6 |
| Methane | 18.3 | 18.2 | 18.5 |
| Ethane | 12.1 | 10.9 | 10.6 |
| Propane | 11.3 | 7.5 | 8.5 |
| Spec. Gravity | 0.44 | 0.37 | 0.39 |
| Motor Gasoline—Comp. and Properties: | | | |
| Wt. per cent: | | | |
| Isobutane | 1.4 | 2.0 | 2.1 |
| N-Butane | 3.7 | 3.0 | 4.5 |
| $C_5$ & Heavier | 94.9 | 95.0 | 93.4 |
| A. P. I. ° | 55.4 | 54.2 | 53.7 |
| R. V. P., 100° F | 8.3 | 9.0 | 10.4 |
| C. F. R.—M gasoline and gas oil | 74.0 | 77.7 | 80.0 |
| C. F. R.—R gasoline and gas oil | 82.8 | 86.3 | 88.6 |
| Inspection of products ($C_5$ to 410° F. fraction): | | | |
| A. P. I. ° | 51.8 | 50.4 | 49.3 |
| I. B. P., ° F | 140 | 130 | 131 |
| E. P., ° F | 378 | 384 | 387 |
| Color | 26 | 30 | 26 |
| Sulfur | 0.1 | 0.2 | 0.2 |
| Brom. No | 6.6 | 6.1 | 6.0 |
| A. S. T. M. gum | Nil | 0.4 | Nil |
| Copper gum | Nil | Nil | Nil |
| $O_2$ induction hrs | 10+ | 10+ | 10+ |
| Doctor | Sweet | Sweet | Sweet |
| Cu Strip | O. K. | O. K. | O. K. |

In deciding upon the particular operating conditions for any given naphtha charge, for the most advantageous operation of the process the characteristics of that charge as well as the fixed properties of the equipment should be taken into consideration. To establish the required heat balance, the different temperatures of the beds of contact mass, of the naphtha vapor and of the gas should be determined. These temperatures can be calculated by taking into account the heat losses through the equipment, the heat of reaction and the cooling effect of the naphtha vapor and fixed gas, and correlated with a desired fixed maximum regeneration temperature of the contact mass. This maximum temperature generally lies in the range of 950°–1000° F., but may in some instances be permitted to go to 1100° F. During the initial contact of the freshly regenerated catalyst with pretreated charge from the first reactor, the catalyst will be reduced to the temperature desired for its use in contacting fresh naphtha, that is to about 950–900° F., and then the temperature of the catalyst will be further reduced on contact with the cooler fresh naphtha charge to about 700–850° F.

In starting up the process a supply of hydrogen or hydrogen-rich gas may be provided from storage or other source until there is a sufficient supply for recycling from the gas formed in the process.

Obviously many modifications and variations of the invention as hereinbefore set forth may be made without departing from the spirit and scope thereof and therefore only such limitations should be imposed as are indicated in the appended claims.

I claim as my invention:

1. In processes for upgrading of hydrocarbons boiling in the range of gasoline and naphthas under dehydrogenation conditions in contact with a dehydrogenation catalyst, the improvement which comprises conducting the treatment in a plurality of stages and under reaction conditions of successively increased severity while controlling the temperature of said stages to effect heating of said hydrocarbons over a wide temperature range by contact with said catalyst, the hydrocarbons being initially heated by contact with catalyst containing carbonaceous deposit, said hydrocarbons when subjected to initial contact with said catalyst containing carbonaceous deposit being at a lower temperature than the said catalyst, and then at a later stage as the reaction progresses said hydrocarbons being heated to and reacted at higher temperature by contact with catalyst in freshly regenerated state.

2. The process of claim 1 in which the carbonaceous deposit contained by the catalyst first employed in contacting the hydrocarbons is that formed as a result of previous contact of the catalyst in freshly regenerated state with partially dehydrogenated hydrocarbons from an earlier stage of the recited process.

3. The process of claim 1 wherein at the end of a fixed period of contact of the hydrocarbons with said catalyst containing carbonaceous deposit, the carbonaceous deposit is burned therefrom by treating said catalyst with oxidizing gas, thereby providing freshly regenerated catalyst for use in subsequent contacting of partially dehydrogenated hydrocarbons formed in an earlier stage of the process and also thereby providing the recited higher temperature employed in said subsequent contacting step.

4. The process of reforming liquid hydrocarbons boiling in the range of gasoline and naphthas which comprises contacting such hydrocarbons in vapor state, under dehydrogenating conditions including superatmospheric pressure and elevated temperature, with a coke-containing dehydrogenation catalyst in the presence of added hydrogen-rich gas, said coked catalyst being at a higher temperature than that of the said hydrocarbons, thereby raising the temperature of said hydrocarbons to and within reaction temperature range for dehydrogenation of said hydrocarbons, passing the thus heated and partially dehydrogenated hydrocarbons into contact with freshly regenerated dehydrogenation catalyst which is at higher temperature than said coke-containing catalyst to effect further reaction of said hydrocarbons at increased temperature, and separating the reaction products into at least a normally liquid hydrocarbon fraction of higher octane rating than the starting hydrocarbon charge and a hydrogen-rich gaseous fraction.

5. The process of claim 4 in which at least a portion of the hydrogen-rich gas separated from the reaction products is recycled for admixture with fresh hydrocarbon charged to the process.

6. The process of claim 4 wherein the said heated and partially dehydrogenated hydrocarbons and the added unreacted hydrogen-rich gas are passed into contact with the freshly regenerated catalyst without separation and without further external application of heat such as would raise the temperature thereof beyond that acquired by contact with said coked catalyst.

7. In the method of producing motor fuel of improved anti-knock qualities from liquid petroleum fractions boiling in the range of gasoline and naphthas by operations involving contacting such a fraction with a catalyst comprising alumina and molybdenum oxide at elevated temperature and pressure in the presence of added hydrogen under conditions which have the net effect of removing hydrogen from hydrocarbons in said fraction as a result of endothermic reactions taking place, which operations are followed by treatment of said catalyst with oxidizing gas to remove carbonaceous deposit resulting from said endothermic reactions, the improvement which comprises first contacting such a petroleum fraction during an endothermic reaction period with catalyst containing carbonaceous deposit and then with more active regenerated catalyst of otherwise like composition under reaction conditions of successively increased intensity including higher reaction temperature, whereby a smaller total quantity of carbonaceous material is deposited, limiting the endothermic reaction period for contact of said fraction with said catalyst to not more than one hour and then burning off the carbonaceous material deposited in the catalyst first contacted, during a required period of time no greater than that of the endothermic reaction period, whereby the over all activity of the catalyst for the endothermic reactions is maintained at a high level.

8. In methods of reforming liquid hydrocarbon fractions of the gasoline and naphtha type at elevated temperature and pressure by endothermic reaction in contact with a dehydrogenation catalyst followed by subjecting the catalyst to regeneration with oxidizing gas to burn off coke formed in said endothermic reaction, the operation which comprises providing a plurality of successive reaction zones containing fixed beds of contact mass comprising dehydrogenation catalyst of successively higher activity as a result of differences in coke content of said mass, flowing such a hydrocarbon fraction in vaporized state through said successive reaction zones at successively increased temperature, regenerating the bed of contact mass of higher coke content by burning coke therein with an oxidizing gas, the coke content of said bed subjected to regeneration being such that heat resulting from the exothermic reaction taking place during regeneration and stored in said contact mass is at least sufficient in amount and is utilized for supplying the heat required for the endothermic reactions taking place in said successive reaction zones.

9. In cyclic process for reforming liquid hydrocarbon charge by contact during an on-stream period at elevated temperature and pressure with dehydrogenation catalyst in the presence of added hydrogen and subsequent regeneration of said catalyst with oxidizing gas to burn off carbonaceous deposit formed therein during the on-stream period, wherein said on-stream period involves at least two stages of reaction of said charge in separate zones, the operation which comprises providing a plurality of separate catalyst beds, one of said beds comprising unregenerated catalyst which has been used previously to complete the conversion of partially dehydrogenated hydrocarbon charge, feeding to said bed of unregenerated catalyst during a fixed period a stream of fresh hydrocarbon charge at a temperature lower than that of said bed to increase the temperature of said charge and to effect a partial dehydrogenation of said hydrocarbon charge, passing the thus heated and partially dehydrogenated hydrocarbon charge to a second bed comprising freshly regenerated catalyst to supply further heat to the charge and to effect further dehydrogenation thereof, during a part of said same fixed period subjecting a separate bed of catalyst containing carbonaceous deposit from previous reactive contact with hydrocarbons to regeneration by burning of said carbonaceous deposit thereby also increasing the temperature of the thus regenerated contact mass; at the end of the recited fixed period transferring the stream of fresh hydrocarbon charge to the bed of catalyst which received partially dehydrogenated charge in the previous recited fixed period, continuing the transferred flow to said bed for a second like fixed period, passing the resulting efflux from said bed during said second fixed period into contact with the bed of hot catalyst freshly regenerated during the first recited fixed period; while during a part of such second fixed period subjecting to regeneration, under regeneration conditions above recited, the bed of catalyst employed in contacting fresh charge during the first recited fixed period; at the end of said second fixed period and like subsequent fixed periods progressing the status of the beds of catalyst so that each bed is successively engaged in (1) regeneration, (2) transformation of partially converted efflux from another bed and (3) for initial contact with fresh charge.

10. A process in accordance with claim 9 wherein the bed comprising freshly regenerated catalyst is at a higher average temperature than that of the bed comprising said unregenerated catalyst, whereby the hydrocarbon charge in passing through said bed of unregenerated catalyst and into and through said bed of freshly regenerated catalyst is successively increased in temperature and undergoes successively increased reaction temperatures over a range of not less than 100° on the Fahrenheit scale.

11. The process in accordance with claim 10 wherein each of said catalyst beds contains as catalyst molybdenum oxide on alumina, which catalyst has intimately associated therewith an inert solid heat absorbing material, said material being of higher heat capacity than said catalyst and being present in predetermined proportions such that the contact mass composed of said catalyst and said heat absorbing material acquires and stores during regeneration a quantity of heat at least sufficient to heat hydrocarbons subsequently contacted therewith in the process to and through the range from desired minimum to desired maximum reaction temperatures.

12. A process in accordance with claim 10 wherein the quantity of fresh hydrocarbon charge brought into contact with the bed comprising unregenerated catalyst during any of said fixed on-stream hydrocarbon contacting periods between alternate regenerations is so limited that the total carbonaceous deposit formed in that bed yields on burning during regeneration substantially the quantity of heat required for changing the temperature of such bed to desired maximum reaction temperature.

13. A process in accordance with claim 9 wherein said bed comprising freshly regenerated catalyst at the start of any of the recited fixed periods is at an average bed temperature in the range of 900° to 1000° F. and the bed comprising said unregenerated catalyst is at a lower average bed temperature in the range of 750–950° F.

14. A process in accordance with claim 9 wherein the alternate on-stream hydrocarbon contacting periods of the catalyst bed between periods of regeneration is maintained relatively short and in the order of not more than one hour, so that the catalyst is subjected to regeneration before it has acquired an excessive quantity of coke.

15. A process in accordance with claim 9 wherein the bed comprising unregenerated catalyst is cooled by contact with the fresh naphtha vapors, whereby the catalyst can be subsequently regenerated with undiluted air, the catalyst being so regenerated during the recited operating cycle without reaching temperatures in excess of the maximum desired for the subsequent contact with the partially dehydrogenated hydrocarbon charge.

16. The process in accordance with claim 9 wherein the unregenerated catalyst after each period of contact with the fresh naphtha vapors as defined is subjected to regeneration when the total content of carbonaceous deposit in said catalyst is not more than 2% by weight of such catalyst.

17. The process in accordance with claim 9 wherein the unregenerated catalyst after a period of contact with the fresh naphtha vapors as defined is subjected to regeneration when the total content of carbonaceous deposit in said catalyst is of the order of ½ to 1% by weight of such catalyst.

18. The process in accordance with claim 9 wherein the fixed periods of contact with hydrocarbons and of treatment by regeneration are so designed and the quantity of hydrocarbon charge is so limited as to maintain during any on-stream hydrocarbon contacting period a catalyst to oil ratio of between 1 and 4.

19. The process for reforming of naphtha under conditions of thermal balance, which comprises providing a plurality of beds of contact mass comprising in intimate association dehydrogenation catalyst and inert solid heat absorbing material, subjecting the contact mass in each of said beds during fixed periods successively: first, to contact under dehydrogenating conditions with partially dehydrogenated naphtha vapors discharged from reactive contact with another of said beds; secondly, to contact under dehydrogenating conditions with vaporized fresh naphtha charge, and subsequently to treatment with an oxidizing gas under conditions to burn off carbonaceous deposits formed in the contact mass as a result of endothermic reactions taking place during the recited first and second successive contacts with the partially dehydrogenated naphtha vapors and fresh naphtha charge; continuously repeating the successive periods of contact and treatment in the recited sequence, the duration of the periods of successive contact being so fixed that the quantity of carbonaceous deposit formed under the selected contacting conditions is burned off by treatment with said oxidizing gas in a time less than any one of said periods of contact, as a result of which burning treatment the contact mass is brought to desired maximum reaction temperature for the aforesaid contact with partially dehydrogenated naphtha vapors and thereafter provides still hot contact mass for the second recited contacting step, said contact mass also having as a result of said burning treatment sufficient heat content to effect the required endothermic reactions taking place during both of the recited contacting steps and to heat up the introduced fresh naphtha vapors to the required reaction temperatures.

20. A process in accordance with claim 19 wherein the catalyst and inert solid heat absorbing material of said contact mass are present in the proportions of 1:3 to 3:2.

21. In the method of catalytically reforming hydrocarbon fractions boiling in the range of gasoline and naphthas under dehydrogenating conditions in contact with a dehydrogenation catalyst at elevated temperature and superatmospheric pressure in the presence of added hydrogen, the operations comprising providing a plurality of separate reaction zones containing fixed beds of catalyst, employing each of said beds of catalyst in a fixed operating cycle involving in recited sequence: first, a period of contact with partially converted and heated hydrocarbons discharged from reactive contact with coked dehydrogenation catalyst; second, a period of contact with fresh hydrocarbon feed in vaporized state; and third, a period during which the catalyst is subjected to regeneration treatment with oxidizing gas to burn off the coke deposited thereon as a result of the reactions taking place during the recited two periods of contact with fresh and partially converted hydrocarbons; during a fixed one of said periods flowing a stream of fresh hydrocarbon feed into a reaction zone containing catalyst having coke therein as a result of previous contact with partially converted and heated hydrocarbons and conducting the efflux therefrom into a second reaction zone containing freshly regenerated catalyst while during a part of said same period catalyst in another of said zones is being subjected to regeneration to burn off previously deposited coke, the heat of burning during said regeneration resulting in the acquisition by the thus regenerated catalyst of the desired maximum temperature employed in contacting the partially converted and heated hydrocarbons with the thus freshly regenerated catalyst, and as a result of which contacting step that catalyst acquires a quantity of coke and is cooled to the temperature employed in the recited initial contact of the fresh hydrocarbon feed with the coked catalyst, said fresh hydrocarbon feed being brought in at a temperature lower than that of said coked catalyst whereby the hydrocarbon feed is heated to desired reaction temperature while the coked catalyst is cooled to a temperature enabling regeneration without intermediate cooling during the regeneration period.

EUGENE J. HOUDRY.

REFERENCES CITED

The following references are of record in the file of this patent:

UNITED STATES PATENTS

| Number | Name | Date |
|---|---|---|
| 2,289,063 | Ocon et al. | July 7, 1942 |
| 2,290,580 | Degnen et al. | July 21, 1942 |
| 2,312,006 | Thiele | Feb. 23, 1943 |
| 2,331,427 | Schulze et al. | Oct. 12, 1943 |
| 2,339,874 | Nysewander et al. | Jan. 25, 1944 |
| 2,357,531 | Mather et al. | Sept. 5, 1944 |
| 2,364,453 | Layng et al. | Dec. 5, 1944 |
| 2,364,739 | Mattox et al. | Dec. 12, 1944 |
| 2,366,567 | Schultz | Jan. 2, 1945 |
| 2,374,109 | Layng et al. | Apr. 17, 1945 |
| 2,386,846 | Dunham | Oct. 16, 1945 |
| 2,386,947 | Hachmuth | Oct. 16, 1945 |
| 2,423,907 | Schulze | July 15, 1947 |